United States Patent Office 3,763,216
Patented Oct. 2, 1973

3,763,216
N-DISUBSTITUTED DERIVATIVES OF α-AMINO ACIDS
Francois Robert Bertrand, Geneva, Switzerland, assignor to Medial de Toledo & Cie, Geneva, Switzerland
No Drawing. Filed Apr. 3, 1968, Ser. No. 718,361
Claims priority, application France, Apr. 11, 1967, 102,195
Int. Cl. C07c 103/22
U.S. Cl. 260—471 A        17 Claims

ABSTRACT OF THE DISCLOSURE

This disclosure concerns disubstituted α-amino acids which have both a phenyl and a benzoyl substituent on the nitrogen atom. These compounds exert anti-inflammatory and analgesic effects in man, as evidenced by clinical evaluation according to standard test procedures.

---

This invention relates to compositions of matter classified in organic chemistry as N-disubstituted-α-amino acids, and to processes for making and using such compositions.

There are already known several processes for preparing N-disubstituted α-amino acids. Some of these derivatives which have interesting biological properties have on the amino group substituted phenyl or substituted benzoyl groups but not both as the presence of both was thought to sterically hinder the molecule. The discovery of the syntheses of the present invention has led to the preparation of novel compounds having unexpected activity.

The invention in its composition aspect resides in the concept of a chemical compound having a molecular structure in which there is attached to the nitrogen atom of a α-amino acid both a substituted phenyl and a substituted benzoyl radical.

According to the preferred embodiments of the present invention these compounds can be defined by the following formula:

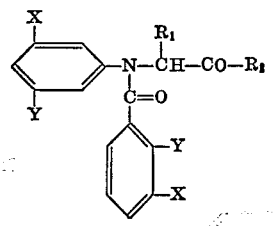

wherein
$R_1$ is hydrogen, alkyl, aryl, alkylaryl, cycloalky or heterocyclic, substitute or unsubstituted; carboxylic group, salified or esterified;
$R_2$ is OH, O–alkyl, O–aryl, O–alkylaryl, O–cycloalkyl, heterocyclic, substituted or unsubstituted; amino, substituted or unsubstituted; an alkali metal or an alkali earth metal salt of the corresponding acid;
X—Y can be the same or different, and are hydrogen, hydroxy, alkyl, aryl, alkoxy, halogen, amono, nitro, sulfo, substituted or unsubstituted.

Further preferred among the above mentioned substituents are the following:

$R_1$=—H, —CH$_3$ —C$_2$H$_5$, C$_6$H$_5$—CH$_2$—,
—CH$_2$—CH$_2$OH

X and Y=—H, —OH, —OCH$_3$, —Cl, —F, —Br, —NO$_2$
—NH$_2$, —CH$_3$, —C$_2$H$_5$ $R_2$=—OH, —ONa, —OK, OCH$_3$, —OC$_2$H$_5$, —Obutyl, —Ohexyl, morpholyl, amino, dimethylamino, diethylamino.

Several synthesis are available for the preparation of the present compounds.

These can be summarized as follows:

The compounds can be prepared by reacting a compound of the formula:

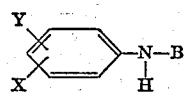

by benzoylation where B is

—CH—CO—R$_2$
|
R$_1$ and by N-alkylation where B is

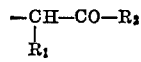

where $R_1$, $R_2$, X and Y are as above defined and also the formula:

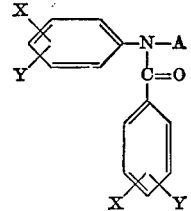

by saponification and decarboxylation where A is

COOR
|
—C—R$_1$
|
COOR by saponification where A is

R$_1$
|
—C—CN
|
H by degradation where A is

R$_1$
|
—C—COCH$_2$Z or COCH$_3$
|         |
          CH—COOC$_2$H$_5$
          | with Z representing a halogen or polyhalogen, quartenary ammonium, aryl or alkylsulfone —SO$_2$—R, sulfonic group or nitro; and by oxidative or thermal degradation where A is

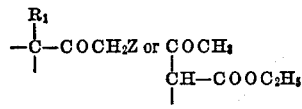

Q being COOR, CONH$_2$, CON$_3$, CN and $R_3$ being H or alkyl.

In the above alkaline synthesis benzoylation can be effected by the chlorides, the anhydrides, the mixed anhydrides or the methyl or ethyl esters of a R-benzoic acid reacting with N—(R—phenyl) of α-amino acid derivatives (glycine, alanine, phenylalanine, etc.) or with their ethyl or methyl esters.

Similarly benzoylation can take place by means of a free R-benzoic acid with derivatives of N-(R-phenyl)-amino acids, or of its esters, in the presence of a catalyst (for example BF$_3$' or p-toluenesulfonic acid).

The synthesis can also take place by means of the substitution of N-(R-phenyl)-N-(amino-benzoyl)amino acids or their esters into N-(R-phenyl)-N-(R-benzoyl) α-amino acids or their esters.

Similarly the synthesis can take place by the N-alkylation of substituted or unsubstituted N-(R-benzoyl)

anilines by means of haloacetic acid methyl or ethyl esters or of similar halopropionic esters in the presence of alkali agents such as sodium, potassium, powdered lithium, $C_1$ to $C_4$ alcoholates of the same elements as well as their hydrides and amides in an aromatic or aliphatic hydrocarbon.

Similarly the present compounds can be prepared by the O-alkylation of N-(p-oxyphenyl)-p-chlorobenzamides in alkali medium by means of monomethyl and monoethyl sulphuric acids, dimethyl and diethyl sulphuric acids, methyl and ethyl paratoluene sulfonates, methyl or ethyl halides, diazomethane or diazoethane.

It is thus possible to synthesize the present compounds as follows:

(1) Benzoylation of N-(p-alkoxyphenyl) glycines and alanines or of their esters.

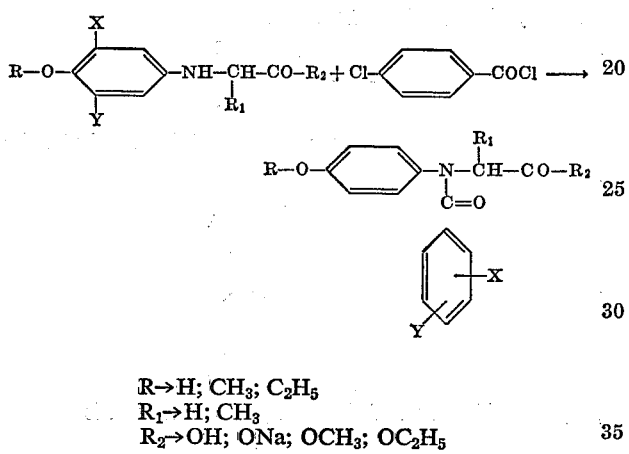

R→H; CH$_3$; C$_2$H$_5$
R$_1$→H; CH$_3$
R$_2$→OH; ONa; OCH$_3$; OC$_2$H$_5$ (2) Substitutions of p-aminobenzamides into p-chlorobenzamides.

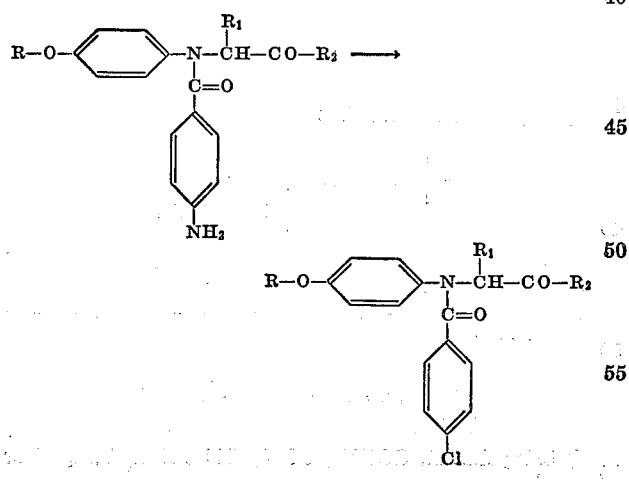

(3) N-alkylation of (p-alkoxyphenyl) p-chlorobenzamides.

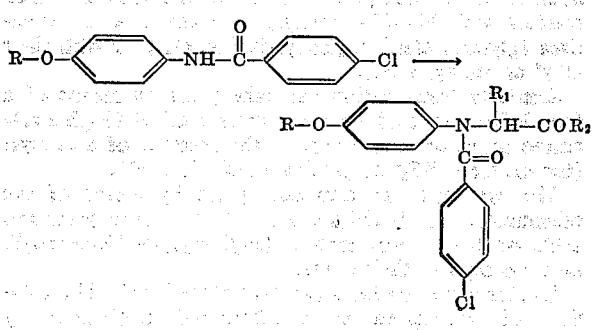

(4) O-alkylation of substituted N-(p-oxyphenyl) N-p-chlorobenzamides.

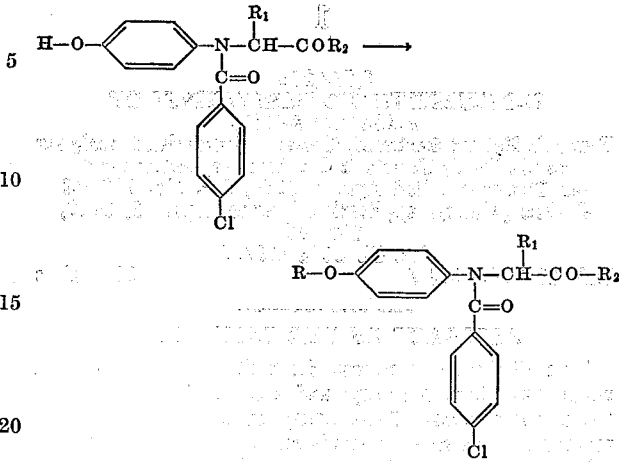

(5) Saponification and decarboxylation of N-(p-alkoxyphenyl)-N-p-(chlorobenzoyl) amino malonic acid and esters.

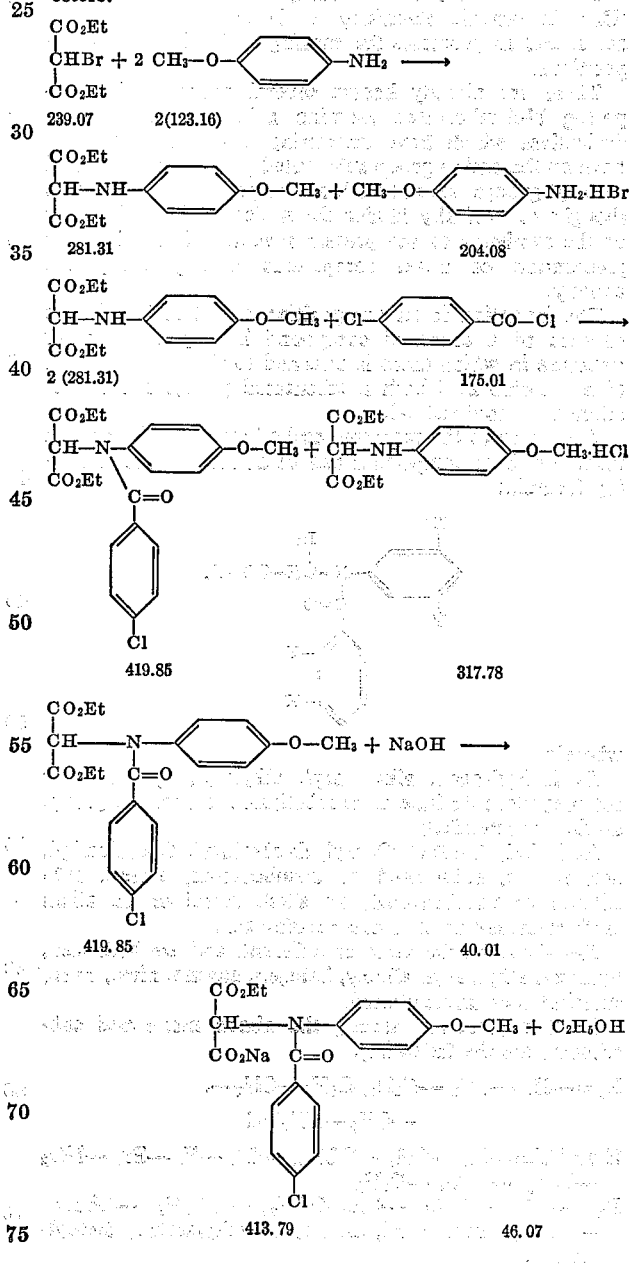

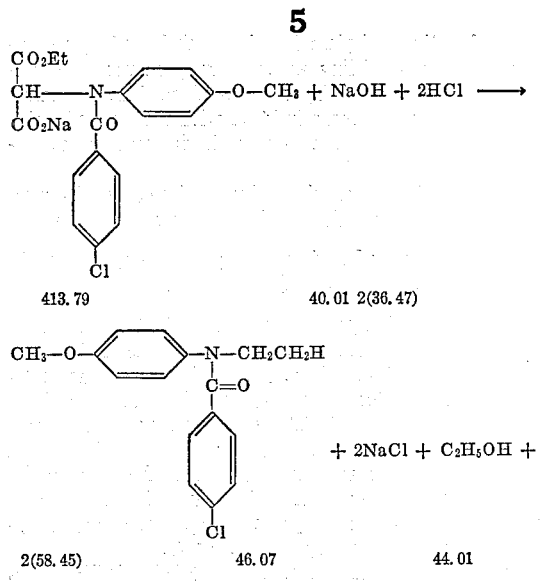

(6) Oxidative or thermal degradation of lactic and pyruvic acids by heating or by oxidation with hydrogen peroxide, lead tetra-acetate or dilute sulfuric acid.

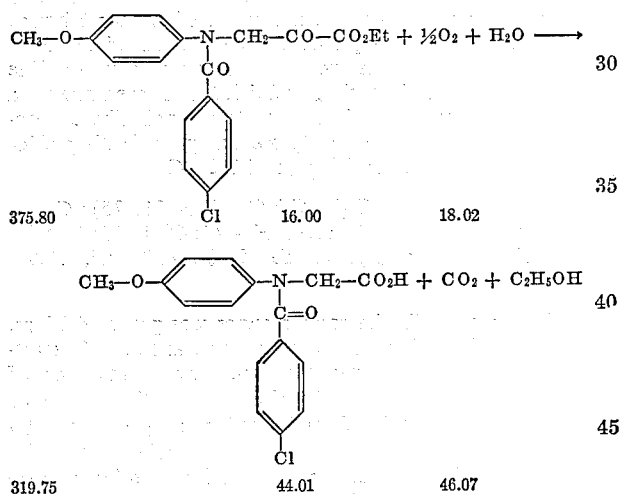

This degradation applies to the following structures, the vertical dotted lines showing the cleavage points:

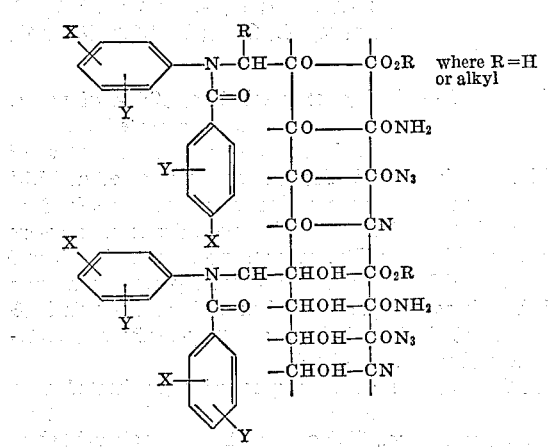

and to the ether and alcohol and derivatives thereof:

(7) Degradation of methylketones:

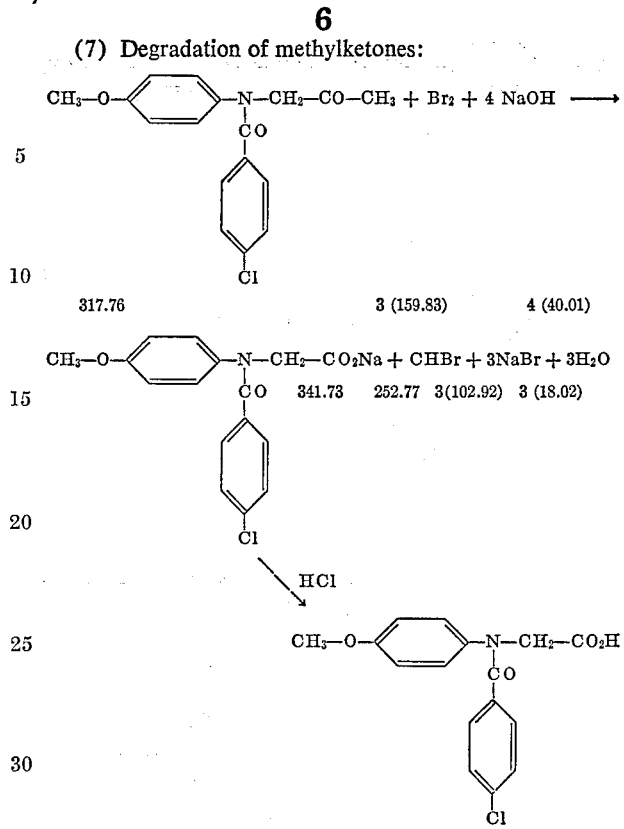

This applies to the following structures:

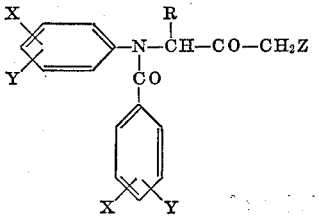

R = alkyl, H
Y, X are a halogen
Z is—
  a halogen or polyhalide
  a quaternary ammonium
  an aryl or alkyl sulfone —$SO_2$—R
  sulfuric or nitro group (8) Saponification of acetonitriles:

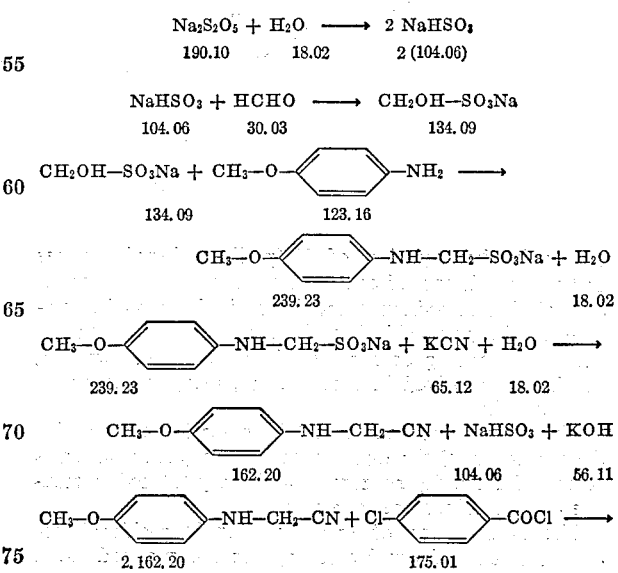

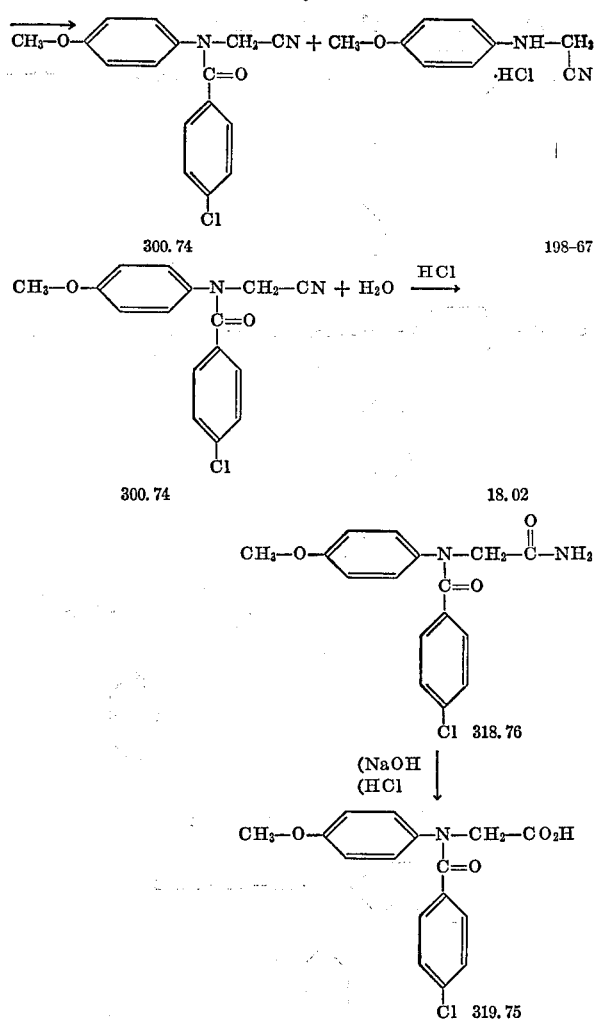

(9) Degradation of

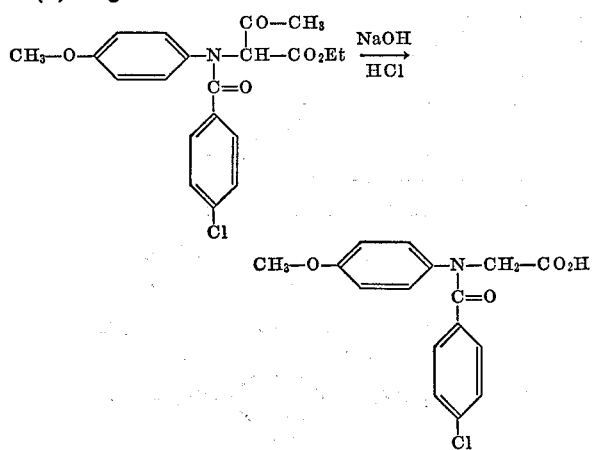

Generally, benzoylation of N-(p-alkoxyphenyl)glycines and alanines is carried out by dissolving them in an aqueous solution of sodium hydroxide and adding to the mixture a R-benzoic acid chloride and acidifying to obtain the corresponding benzamide which is filtered, washed, dried, and dissolved in ether before, recrystallization in absolute ethanol.

The benzoylation can also take place in toluene with the formation of the α-amino acid chlorhydrate which is separated from the benzamide and recrystallized in toluene or in a toluene-benzine mixture.

The N-alkylation of (p-alkoxyphenyl) p-chlorobenzamides is carried out by adding these compounds to a solution of sodium ethylate in toluene followed by refluxing the mixture, distilling at ordinary pressure to eliminate the alcohol freed by the reaction. The insoluble sodium derivative is then alkylated with the desired haloalkyl ester and the residue of this alkylation is recrystallized in benzene-toluene.

The best mode contemplated by the inventor of carrying out his invention will now be set forth as follows:

(A) Benzoylation of N-(p-alkoxyphenyl)-glycines and alanines or of their esters

Example 1.—123.2 gr. of p-anisidine, 108 gr. of water, 123 gr. of anhydrous sodium acetate are mixed and heated with stirring at 50° C. There is added portionwise in ½ hour 94.5 gr. of chloracetic acid and the mixture is kept for one hour at 95–98° C. The reaction mass is dissolved in 1680 gr. of 5% sodium hydroxide then 30 gr. of p-anisidine unreacted are extracted with ether. From the basic solution acidified with 600 gr. of 25% HCl there is extracted with ether 30 gr. of N-(p-methoxyphenyl)-imino-diacetic acid melting at 122–3° C.

After treating with concentrated 35% NaOH to a pH of 3.5, 60 gr. of N-(p-methoxyphenyl)-glycine crystallize having a melting point of 142–3° C.

181.2 gr. of the above compound have dissolved in 600 gr. of water together with 1200 gr. of 10% NaOH. There is added at 20° 192.5 gr. of p-chlorobenzoic chloride over a half hour period and the mixture is stirred for 3 hours. After acidifying to a pH of 2 there is obtained 318.5 gr. of p-chlorobenzamide which is insoluble in water. The product is filtered, washed and dried. It is then mixed in ether and recrystallized in absolute ethanol. There is obtained then 196 gr. of N-(p-methoxyphenyl)-N-(p-chlorobenzoyl)-glycine melting at 191–2° C.

Empirical formula: $C_{16}H_{14}ClNO_4$ (MW 319.75); Calculated (percent): C, 60.10; H, 4.41; Cl, 11.09; N, 4.38. Found (percent): C, 59.85; H, 4.38; Cl, 10.94; N, 4.45.

Example 2.—In the same manner was prepared 70 gr. of N-(p-ethoxyphenyl)-glycine melting at 138–140° starting with 137.2 g. of p-phenetidine. The benzoylation of 195.2 g. of N-(p-ethoxyphenyl)-glycine with 192.5 g. of p-chlorobenzoic acid chloride under the previously described conditions gave 350 g. of p-chlorobenzamide. By suspending in ether then recrystallizing in toluene there is obtained 244 g. of N-(p-ethoxyphenyl)-N-(p-chlorobenzoyl)-glycine melting at 156–8° C.

Empirical formula: $C_{17}H_{16}ClNO_4$ (MW 333.78); Calculated (percent): C, 61.17; H, 4..83; Cl, 10.62; N, 4.20. Found (percent): C, 61.26; H, 4.69; Cl, 10.43; N, 4.26.

Example 3.—123.2 g. of p-anisidine, 108 g. of water, 123 g. of anhydrous sodium acetate are heated with stirring at 50° C. In ½ hour were introduced 108 g. of α-chloropropionic acid. The mixture was heated at 95.8° for an hour then the reaction mass was dissolved in 1680 g. of 5% NaOH. 30 g. of unreacted p-anisidine were extracted with ether. The solution was acidified with 600 g. of 25% HCl. The extraction was repeated with ether and then there was precipitated at a pH of 3.5 with 35% concentrated NaOH 130 g. of N-(p-methoxyphenyl)-alanine melting at 176–8° C.

195.2 g. of the above compound were heated with stirring in 2 litres of toluene at 75–80° C. In ½ hour there was introduced 87.5 g. of p-chlorobenzoic acid chloride diluted with 100 ml. of toluene. The reaction was allowed to proceed for 7 hours at 80° C. There formed an abundant precipitate which was filtered and dried. The chlorhydrate of N-(p-methoxyphenyl)-alanine was mixed with 730 g. of 5% HCl. The insoluble p-chlorobenzamide was filtered, washed, and dried. It was recrystallized in toluene.

There was thus obtained 114 g. of N-(p-methoxyphenyl)-N-(p-chlorobenzoyl)-alanine, melting at 154–6°.

Empirical formula: $C_{17}H_{16}ClNO_4$ (MW 333.78):
  Calculated (percent): C, 61.17; H, 4.83; Cl, 10.62; N, 4.20.
  Found (percent): C, 61.01; H, 4.75; Cl, 10.58; N, 4.31.

Example 4.—Under the same conditions 137.2 g. of p-phenetidine gave 140 g. of N-(p-ethoxyphenyl)-alanine melting at 178–180° C.

209.2 g. of N-(p-ethoxyphenyl)-alanine are benzoylated in toluene at 75–80° with 87.5 g. p-chlorobenzoic acid chloride. Only the chlorhydrate of the secondary amine crystallizes. It is filtered and then the p-chlorobenzamide is extracted with 800 g. of 5% NaOH. There forms an emulsion which is broken with ether. The basic solution is neutralized to pH 3.5 with concentrated HCl at 25% to precipitate 145 g. of unpurified p-chlorobenzamide. The product is crystallized in a mixture of toluene-benzine at 50%. There is obtained 118 g. of N-(p-ethoxyphenyl)-N-(p-chlorobenzoyl)-alanine melting at 123–5° C.

Empirical formula: $C_{18}H_{18}ClNO_4$ (M=347.80):
  Calculated (percent): C, 62.17; H, 5.22; Cl, 10.20; N, 4.03.
  Found (percent): C, 62.08; H, 5.18; Cl, 10.02, N, 4.09.

Example 5.—123.2 g. of p-anisidine, 82 g. of anhydrous sodium acetate, 54 g. of water, 100 ml. of ethanol are heated with stirring at 50° C. There is slowly introduced in 1½ hours 122.6 g. of ethyl chloracetate and the mixture is refluxed for 5 hours. The reaction mass is dissolved in 1460 g. of 5% HCl and the iminodiacetic derivative is extracted with ether then neutralized at a pH of 6.6 with 35% NaOH in the presence of ether. The ethereal solution is decanted and distilled to dryness under vacuum. The crystalline residue weighs 180 g. The residue is distilled under vacuum of 1 mm. Hg. There is obtained 10 g. of anisidine $E_1$=90° nontransformed, then 150 g. $E_1$=155° of N-(p-methoxyphenyl)-glycine ethylester melting at 54–56°.

209.2 g. of N-(p-methoxyphenyl)-glycine ethylester, 87 g. of pyridine, 1250 ml. of toluene are mixed at 15°. There is introduced between 15–20° in ¾ of an hour with stirring a mixture of 178.5 g. of p-chlorobenzoic acid chloride and 250 ml. of toluene. The p-chlorobenzamide is recrystallized in benzine containing 10% of toluene. There is thus obtained 307 g. of N-(p-methoxyphenyl)-N-(p - chlorobenzoyl)-glycine ethylester melting at 67–68°.

209.2 g. of N-(p-methoxyphenyl)-glycine ethylester, 295.1 g. of p-chlorobenzoic acid anhydride, and 2 litres of toluene are refluxed for 4 hours with stirring. After cooling, the crystallized p - chlorobenzoic acid is filtered and then the solution is successively extracted with 5% sodium carbonate, then 5% HCl. After concentration under vacuum of the toluene, there is obtained 320 g. of N-(p-methoxyphenyl)-N-(p-chlorobenzoyl)-glycine ethyl ester which are recrystallized in benzine containing 10% of toluene melting at 67–68°.

Empirical formula: $C_{18}H_{18}ClNO_4$ (M=347.80):
  Calculated (percent): C, 62.17; H, 5.22; Cl, 10.20; N, 4.03.
  Found (percent): C, 61.98; H, 5.12; Cl, 10.11; N, 4.15.

Example 6.—Under the same conditions 137.2 g. of p-phenetidine yield 160 g. of N-(p-ethoxyphenyl)-glycine ethylester melting at 42–3° C. By benzoylating 223.3 g. of N-(p-ethoxyphenyl)-glycine ethylester with 178.5 g. of p-chlorobenzoic acid chloride in the presence of pyridine in toluene there is obtained 320 g. of N-(p-ethoxyphenyl)-N-(p-chlorobenzoyl)-glycine ethyl ester melting at 85–87°.

Empirical formula: $C_{19}H_{20}ClNO_4$ (M=361.80):
  Calculated (percent): C, 63.08; H, 5.57; Cl, 9.80; N, 3.87.
  Found (percent): C, 62.97; H, 5.48; Cl, 9.69; N, 3.91.

Example 7.—In the same manner 123.2 g. of p-anisidine, 82 g. of anhydrous sodium acetate, 54 g. of water, 100 ml. of ethanol are heated with stirring at 50°. There is introduced in 1½ hours 136.6 g. of α-ethyl chloropropionate with reflux for 5 hours. After dissolving the mass in 1460 g. of 5% HCl the impurities are extracted with ether. Neutralization to pH of 6.6 is carried out in the presence of ether and there is obtained after concentration 170 g. of crystalline residue. Distillation is carried out under vacuum at 1 mm. of mercury and there is obtained at 90° 46.7 g. of unreacted p-anisidine, then 114.6 g. of N-(p-methoxyphenyl)-alanine ethylester at 131–3° C.

223.3 g. of the above product, 87 g. of pyridine, 1250 ml. of toluene are mixed at 15°. There is introduced at between 15–20° in ¾ of an hour with stirring a mixture of 178.5 g. of p-chlorobenzoic acid chloride and 250 ml. of toluene. Stirring is continued for 3 hours at 20°. The pyridine chlorhydrate is filtered and the toluene is concentrated under vacuum. There is obtained 350 g. of N-(p - methoxyphenyl)-N-p-chlorobenzoyl) - alanine ethyl ester which is distilled under vacuum at 1 mm. of mercury $E_1$=205–8°.

Empirical formula: $C_{19}H_{20}ClNO_4$ (M=361.80):
  Calculated (percent): C, 63.08; H, 5.57; Cl, 9.80; N, 3.87.
  Found (percent): C, 63.11; H, 5.54; Cl, 9.71; N, 3.85.

Example 8.—Under the same conditions, 137.2 g. of p-phenetidine yield 120 g. of N-(p-ethoxyphenyl)-alanine ethylester $E_1$=152–3°, melting at 34–35° C.

By benzoylating 237.3 g. of N-(p-ethoxyphenyl)-alanine ethyl ester with 178.5 g. of p-chlorobenzoic acid chloride in the presence of pyridine in toluene there is obtained 224 g. of N-(p-ethoxyphenyl)-N-(p-chlorobenzoyl)-alanine ethylester $$E_1=218-220°$$

Empirical formula: $C_{20}H_{22}ClNO_4$ (MW 375.83):
  Calculated (percent): C, 63.92; H, 5.90; Cl, 9.41; N, 3.73.
  Found (percent): C, 63.81; H, 5.82; Cl, 9.50; N, 3.81.

Example 9.—347 g. of N-(p - methoxyphenyl)-N-(p-chlorobenzoyl)-glycine ethylester are refluxed with a mixture of 60 g. of NaOH, 60 g. of water and 480 g. of ethanol for 20 minutes. At the end of the saponification, there is added 600 g. of water to dissolve the sodium salt precipitate. There is filtered a light precipitate and acidification is carried out at pH 3.5 with 10% HCl. There is thus obtained 304 g. of N-(p-methoxyphenyl)-N-(p-chlorobenzoyl)-glycine which is recrystallized in ethanol and melts at 191–2° C.

Empirical formula: $C_{16}H_{14}ClNO_4$ (MW=319.75):
  Calculated (percent): C, 60.10; H, 4.41; Cl, 11.09; N, 4.38.
  Found (percent): C, 59.85; H, 4.38; Cl, 10.94; N, 4.45.

In the same manner it is possible to transform the above described products of Examples 6, 7 and 8 to the products described in the Examples 2, 3 and 4.

(B) Substitution of N-p-aminobenzamides into N-p-chlorobenzamides

Example 10.—108.7 g. of N-(p-methoxyphenyl) glycine and 750 ml. of toluene are heated to 75–80°. There is introduced 55.7 g. of p-nitrobenzoic acid chloride dissolved in 150 ml. of toluene over ½ hour with stirring and the mixture is kept for 2 hours at 80°. After crystallization, the mixture is filtered and the precipitate is dried. It is mixed in 440 g. of 2.5% HCl and the insoluble p-nitrobenzamide is recovered by filtration. There is obtained 97.8 g. of N-(p-methoxyphenyl)-N-(p-nitrobenzoyl) glycine melting at 161–2°.

Empirical formula: $C_{16}H_{14}N_2O_6$ (MW 330.28):
    Calculated (percent): C: 58.19, H: 4.27, N: 8.48
    Found (percent): C: 58.02, H: 4.21, N: 8.42

33 g. of the above product are dissolved in 350 ml. of methanol. There is added 1 g. of palladium on activated charcoal 10%, then hydrogenation is carried out at room temperature under pressure of 1.2 atmospheres. The catalyst is filtered and the mixture is concentrated to dryness under vacuum. The residue is recrystallized in absolute ethanol. There is thus obtained 24 g. of N-(p-methoxyphenyl)-N-(p-aminobenzoyl) glycine melting at 173–4°.

Empirical formula: $C_{16}H_{16}N_2O_4$ (MW=300.27):
    Calculated (percent): C: 64.00, H: 5.37, N: 9.33
    Found (percent): C: 64.11, H: 5.28, N: 9.29

30 g. of the above product are dissolved in 65 ml. of 6 N HCl. Diazotization at 0° is carried out with 7.3 g. of sodium nitrite in solution in 25 ml. of water. 12.4 g. of freshly prepared cuprous chloride are dissolved in 100 ml. of 25% HCl at 30°. There is slowly introduced with stirring a solution of diazonium salt in that of the cuprous chloride and the reaction is allowed to proceed for 1 hour at 30°. The precipitate is filtered, washed and dried and recrystallized in ethanol. There is thus obtained 15 g. of N - (p-methoxyphenyl)-N-(p-chlorobenzoyl) glycine melting at 191–2°.

In the same manner was prepared: N-(p-ethoxyphenyl)-N-(p-nitrobenzoyl) glycine melting at 181–2°.

Empirical formula: $C_{17}H_{16}N_2O_6$ (MW=344.31:
    Calculated (percent): C: 59.30, H: 4.68, N: 8.14
    Found (percent): C: 59.21, H: 4.62, N: 8.08

There was also prepared: N-(p-methoxyphenyl)-N-(p-nitrobenzoyl) alanine melting at 130–2°.

Empirical formula: $C_{17}H_{16}N_2O_6$ (MW 344.31):
    Calculated (percent): C: 59.30, H: 4.68, N: 8.14
    Found (percent): C: 59.18, H: 4.59, N: 8.01

There was also prepared: N-(p-ethoxyphenyl)-N-(p-nitrobenzoyl) alanine melting at 90–91°.

Empirical formula: $C_{18}H_{18}N_2O_6$ (MW 358.34):
    Calculated (percent): C: 60.33, H: 5.06, N: 7.82
    Found (percent): C: 60.21, H: 5.00, N: 7.79

By reduction with 10% palladium on charcoal in methanol there is obtained: N-(p-ethoxyphenyl)-N-(p-aminobenzoyl) glycine melting at 166–7°.

Empirical formula: $C_{17}H_{18}N_2O_4$ (MW 314.30):
    Calculated (percent): C: 64.97, H: 5.77, N: 8.91
    Found (percent): C: 64.86, H: 5.75, N: 8.84

There is also prepared: N-(u-methoxyphenyl)-N-(p-aminobenzoyl) alanine melting at 198–9°.

Empirical formula: $C_{17}H_{18}N_2O_4$ (MW 314.30):
    Calculated (percent): C: 64.97, H: 5.77, N: 8.91
    Found (percent): C: 64.92, H: 5.72, N: 8.90

There is also prepared: N-(p-ethoxyphenyl)-N-(p-aminobenzoyl) alanine melting at 177–8°C.

Empirical formula: $C_{18}H_{20}N_2O_4$ (MW=328.32):
    Calculated (percent): C: 65.85, H: 6.14, N: 8.53
    Found (percent): C: 65.86, H: 6.11, N: 8.56

(C) N-alkylation of (p-alkoxyphenyl)-p-chlorobenzamides

Example 11.—123.2 g. of p-anisidine, 87 g. of pyridine, 1000 ml. of chloroform are treated at 15° with 175 g. of p-chlorobenzoic acid chloride dissolved in 500 ml. of chloroform. After several hours, there is filtered 244.6 g. of N-(p-chlorobenzoyl)-p-anisidine which is recrystallized in toluene and melting at 205–6° C.

In 300 ml. of dry toluene there is formed 13.6 g. of sodium ethylate from 4.6 g. of sodium and 9.5 g. of absolute ethanol. There is added 52.2 g. of N-(p-chlorobenzoyl)-p-anisidine and 50 ml. of toluene, then the mixture is refluxed for ½ hour. There is distilled 100 ml. of toluene under ordinary pressure to eliminate the ethanol freed by the reaction. The insoluble sodium derivative is treated with 25.7 g. of ethyl chloroacetate, then the residue (62 g.) is recrystallized in benzine containing 10% of toluene. There is thus obtained N-(p-methoxyphenyl)-N-(p-chlorobenzoyl) glycine ethylester melting at 67–8° and resembles the product of Example No. 5.

Example 12.—In the same fashion 137.2 g. of p-phenetidine and 175 g. of p-chlorobenzoic acid chloride yield 202 g. of (p-chlorobenzoyl)-p-phenetidine which are recrystallized in absolute ethanol and melt at 188–9° C. By alkylation with chloroacetic ester or α-chloropropionic there can be obtained the products described in Examples 2, 3 and 4.

(D) O-alkylation of N-(p-hydroxyphenyl) benzamides

Example 13.—109 g. of p-aminophenol are heated at 75° in 350 ml. of ethanol. There is introduced 61.3 g. of ethyl chloracetate and the mixture is refluxed for 3 hours. After cooling, the p-aminophenol chlorhydrate is filtered and the solution is concentrated to dryness under vacuum. The residue is dissolved in 1460 g. of 5% HCl. The impurities are extracted with ether and the solution is neutralized to a pH of 5.5 with 35% concentrated NaOH in the presence of ether. After distillation there is obtained 86.1 g. of crystalline residue. Recrystallization is carried out in 750 ml. of toluene to obtain 76 g. of N-(p-hydroxyphenyl)-glycine ethylester melting at 74–5°.

39 g. of N-(p-hydroxyphenyl) glycine ethylester and 200 ml. of toluene are heated at 80°. There is introduced 17.5 g. of p-chlorobenzoic acid chloride dissolved in 50 ml. of toluene and the mixture is heated for an hour. After cooling, the reaction mixture is filtered. The dry precipitate is mixed with 73 g. of 5% HCl in 100 ml. of water. The precipitate is filtered and dried. By recrystallizing in toluene there is obtained 29.5 g. N-(p-hydroxyphenyl) - N - (p-chlorobenzoyl) glycine ethylester melting at 148–150°.

Empirical formula: $C_{17}H_{16}ClNO_4$ (MW 333.78):
    Calculated (percent): C: 61.17, H: 4.83, Cl: 10.62, N: 4.20
    Found (percent): C: 61.06, H: 4.79, Cl: 10.51, N: 4.26

Example 14.—In the same manner, 109 g. of p-aminophenol are treated in 350 ml. of ethanol with 75.1 g. of ethyl α-chloropropionate with reflux of 6 hours. There is obtained 74.5 g. of N-(p-hydroxyphenyl) alanine ethylester melting at 80–1°. 41.8 g. of this product are benzoylated with 17.5 g. of p-chlorobenzoic acid chloride in toluene at 80° for 6 hours. The chlorhydrate is filtered and the toluene solution is concentrated to dryness to recover 23.2 g. of N-(p-hydroxyphenyl-N-(p-chlorobenzoyl) alanine ethylester melting at 106–107°.

Empirical formula: $C_{18}H_{18}ClNO_4$ (MW 347.80):
Calculated (percent): C: 62.17, H: 5.22, Cl 10.20, N: 4.03
Found (percent): C: 61.99, H: 5.18, Cl: 10.08, N: 4.01

Example 15.—33.4 g. of N-(p-hydroxyphenyl)-N-(p-chlorobenzoyl) glycine ethylester, 264 g. of NaOH at 5% are mixed at 20°. There is added with stirring over ½ hour 41.6 g. of methyl sulphate. After several hours of reaction, the pH falls to 6. There is added then 344 g. of 5% NaOH and then the mixture is heated for ½ hour to 60–65° until disappearance of the precipitate. The mixture is treated with charcoal, filtered and neutralized with 25% HCl to pH 2. There is thus 24.1 g. of N-(p-methoxyphenyl)-N-(p-chlorobenzoyl) glycine which is recrystallized in absolute ethanol to a melting point of 191–2° C. the product being identical to that obtained by Example 1.

The p-ethoxy derivatives are obtained by alkylation with ethyl sulphate.

(E) Saponification and decarboxylation of N-(p-alkoxyphenyl)-N-(p-chlorobenzoyl)-amino-malonic esters or acids Example 16.—246.3 g. of p-anisidine in 500 ml. of toluene are heated at 60°. There is introduced with stirring over ¾ of an hour 241.5 g. of ethyl α-bromomalonate and the temperature is allowed to rise to 75° C. It is maintained at 80° C. for 2½ hours. The bromohydrate of p-anisidine is removed in the cold. The mixture is extracted with an aqueous 5% HCl solution which is then neutralized and concentrated to dryness under vacuum. There is obtained 287.6 g. of N-(p-methoxyphenyl)-aminoethyl malonate, melting at 58–59° C. after recrystallization in toluene-benzine.

281.3 g. of the above compound are benzoylated in 600 ml. of toluene at 75° C. with 88.4 g. of p-chlorobenzoic acid chloride dissolved in 100 ml. of toluene. After filtering the chlorhydrate of the secondary amine extraction is carried out with an aqueous 5% solution HCl which is neutralized and concentrated under vacuum to dryness. The residue constituted by 220 g. of N-(p-methoxyphenyl) - N - (p - chlorobenzoyl)-amino-ethyl malonate does not crystallize. It is dissolved in 360 ml. of ethanol then treated slowly with stirring and cooling to 15–18° for 20 minutes with 480 g. of an aqueous 10% solution of NaOH. The solution is then rapidly heated to 65° kept for 20 minutes at this temperature then cooled to 20°. With stirring 1 litre of water is added.

180.3 g. of N-(p-methoxyphenyl)-N-(p-chlorobenzoyl)-amino-ethyl-monomalonate and sodium crystallize and melt with decomposition at 235–240° C.

41.4 g. of the sodium mono ester and 400 g. of a 2.5% aqueous NaOH solution are heated at 98° for 1 hour with stirring. The solution is cooled to 20° neutralized and acidified with 56.6 g. of 25% concentrated HCl. The benzoylated amino-malonic acid separates in the form of an oil. The reaction mixture is heated for 1 hour under reflux with strong stirring. Decarboxylation begins around 60°. After ¼ of an hour N-(p-methoxyphenyl)-N-(p-chlorobenzoyl)-glycine crystallizes. The mixture is cooled, the pH is brought to 3.5 then 25.6 g. of product melting at 190–1° C. is filtered.

Recrystallization in 80 ml. of absolute ethanol gives 21.6 g. of a product melting at 191–192° of a product having an excellent quality which can be checked by thin layer chromatography.

(F) Saponification of N-(p-alkoxyphenyl)-N-(p-chlorobenzoyl)-aminoaceto-nitrile

Example 17.—There is formed a solution of 399.2 g. of sodium bisulphite in 650 ml. of water with agitation. At cooling there is introduced at 15–20° 343.2 g. of an aqueous solution of formaldehyde at 35%. The mixture is then heated for a ½ hour to 35° C. The temperature is brought to 45° then there is rapidly introduced in the reaction mass 192.6 g. of p-anisidine. Heating is continued with stirring. At 60° the reaction begins. There is added 200 ml. of water then heating is continued and the temperature is maintained for an hour at 80°. A solution of 260.5 g. of potassium cyanide in 500 ml. of water is prepared which is introduced in the reaction mass at 70–75° with stirring. The crystalline sulfonic derivative disappears rapidly the N - (p - methoxyphenyl)-amino-acetonitrile forms a second liquid phase which is finely dispersed. After a ½ hour reaction time at 75°, cooling is carried out and crystallization is begun at 45°.

580.7 g. of amino nitrile are filtered which melt at 73° C. after recrystallizing in toluene.

162.2 g. of N-(p-methoxyphenyl) amino-acetonitrile are benzoylated at 20–25° C. with 87.5 g. of p-chlorobenzoyl chloride dissolved in 100 ml. of toluene. The mixture is agitated for 1 hour at ambient temperature then for 2 hours at 40° C. After filtering the chlorohydrate of the aminonitrile, the toluene is concentrated to dryness under vacuum. The residue, 135.5 g., consisting of N-(p-methoxyphenyl)-N-(p-chlorobenzoyl) amino acetonitrile does not crystallize.

77.0 g. of this product are treated with 350 ml. of 33% concentrated HCl with agitation for 1 hour at 70° C. After a reaction time of 10 minutes, a precipitate appears. The same is cooled at 20° C. then diluted with 1 litre of water. After crystallization in the refrigerator, 65.7 g. of N-(p-methoxyphenyl)-N-(p-chlorobenzoyl) glycine amide are collected, this product melts at 160–162° C. in the reaction mass 192.6 g. of p-anisidine. Heating is continued with stirring. At 60° the reaction begins. There is added 200 ml. of water then heating is continued and the temperature is maintained for an hour at 80°. A solution of 260.5 g. of potassium cyanide in 500 ml. of water is prepared which is introduced in the reaction mass at 70–75° with rapid stirring. The crystalline sulfonic derivative disappears rapidly then N-(p-methoxyphenyl)-amino-acetonitrile forms a second liquid phase which is finely dispersed. After a ½ hour reaction time at 75°, cooling is carried out and crystallization is begun at 45°. After cooling and adjusting the pH at 3.5 there is filtered 25.6 g. of product melting at 190–191° C. Recrystallization in 80 ml. of absolute ethanol gives 1.6 g. of product melting at 191–192° which is a product of excellent quality as checked by thin layer chromatography.

The compositions constituting the invention have been made also with certain substituents other than those hereinbefore enumerated added to the phenyl and benzoyl portion of the nucleus, and, as determined by pharmacological evaluation, the toxicity and anti-inflammatory activity of the compositions so modified is not materially affected. Such additions to the molecular structure of the inventive concept herein disclosed are, therefore, equivalents of the subject matter sought to be patented.

All the starting materials used in the synthesis described herein are known or are readily prepared in manner well known to those skilled in the art.

Similarly it is possible to use starting materials having thereon the desired X, Y and R, substituents or else these may be introduced at a subsequent stage of the synthesis, which of the two alternatives is followed will depend on availability of the compounds and other considerations evident to organic chemists.

Other compounds according to the invention are tabulated in the following table with reference to their preferred mode of synthesis numbered as above:

| Example | Starting material | Method | Product | M.P., °C. or other |
|---|---|---|---|---|
| 20 | N-(p-methoxyphenyl)glycine | 1 | N-(p-methoxyphenyl)N-(p-chlorobenzoyl)glycine | 191-2 |
| 21 | N-(p-ethoxyphenyl)glycine | 1 | N-(p-ethoxyphenyl)N-(p-chlorobenzoyl)glycine | 156-8 |
| 22 | N-(p-methoxyphenyl)alanine | 1 | N-(p-methoxyphenyl)N-(p-chlorobenzoyl)alanine | 154-6 |
| 23 | N-(p-ethoxyphenyl)alanine | 1 | N-(p-ethoxyphenyl)N-(p-chlorobenzoyl)alanine | 123-5 |
| 24 | N-(p-methoxyphenyl)glycine ethylester | 1 | N-(p-methoxyphenyl)N-(p-chlorobenzoyl)glycine ethylester | 67-8 |
| 25 | N-(p ethoxyphenyl) glycine ethylester | 1 | N-(p ethoxyphenyl) N-(p-chlorobenzoyl) glycine ethylester | 85-7 |
| 26 | N-(p-methoxyphenyl) alanine ethylester | 1 | N-(p-methoxyphenyl)N-(p-chlorobenzoyl)alanine ethylester | (¹) |
| 27 | 2-N-(p-ethoxyphenyl) amino-methylbutyrate | 1 | 2-N-(p-ethoxyphenyl)N-(p-chlorobenzoyl) amino-methyl-butyrate | |
| 28 | N-(2,4-dimethoxyphenyl) glycine | 1 | N-(2,4-dimethoxyphenyl)N-(p-chlorobenzoyl) glycine | |
| 29 | N-(3,4-dimethoxyphenyl) glycine | 1 | N-(3,4-dimethoxyphenyl)N-(p-chlorobenzoyl) glycine | 173.5-5 |
| 30 | N-(2,4-dimethoxyphenyl) glycine methylester | 1 | N-(2,4-dimethoxyphenyl)N-(p-chlorobenzoyl) glycine methylester | |
| 31 | N-(3,4-dimethoxyphenyl) glycine methylester | 1 | N-(3,4-dimethoxyphenyl)N-(p-chlorobenzoyl) glycine methylester | |
| 32 | N-(2,4-dimethoxyphenyl) alanine | 1 | N-(_,4-dimethoxyphenyl)N-(p-chlorobenzoyl) alanine | |
| 33 | N-(3,4-dimethoxyphenyl) alanine | 1 | N-(3,4-dimethoxyphenyl)N-(p-chlorobenzoyl) alanine | |
| 34 | N-(2,4-dimethoxyphenyl) alanine ethylester | 1 | N-(_,4-dimethoxyphenyl)N-(p-chlorobenzoyl) alanine ethylester | |
| 35 | N-(3,4-dimethoxyphenyl) alanine ethylester | 1 | N-(3,4-dimethoxyphenyl)N-(p-chlorobenzoyl) alanine ethylester | |
| 36 | N-(p-hydroxyphenyl) glycine | 4 | N-(p-hydroxyphenyl)N-(p-chlorobenzoyl) glycine | 197-9 |
| 37 | N-(p-hydroxyphenyl) alanine | 4 | N-(p-hydroxyphenyl)N-(p-chlorobenzoyl) alanine | 195-7 |
| 38 | N-(p-hydroxyphenyl) glycine ethylester | 4 | N-(p-hydroxyphenyl) N-(p-chlorobenzoyl) glycine ethylester | 148-50 |
| 39 | N-(p-hydroxyphenyl) alanine ethylester | 4 | N-(p-hydroxyphenyl) N-(p-chlorobenzoyl) alanine ethylester | 106-7 |
| 40 | N-(p-methoxyphenyl) glycine | 2 | N-(p-methoxyphenyl)N-(p-nitrobenzoyl) glycine | 161-2 |
| 41 | | 2 | N-(p-methoxyphenyl) N-(p-aminobenzoyl) glycine | 173-4 |
| 42 | N-(p-ethoxyphenyl) glycine | 2 | N-(p-ethoxyphenyl) N-(p-nitrobenzoyl) glycine | 181-2 |
| 43 | | 2 | N-(p-ethoxyphenyl) N-(p-aminobenzoyl) glycine | 166-7 |
| 44 | N-(p-methoxyphenyl) alanine | 2 | N-(p-methoxyphenyl) N-p-nitrobenzoyl) alanine | 130-2 |
| 45 | | 2 | N-(p-methoxyphenyl) N-(p-aminobenzoyl) alanine | 198-9 |
| 46 | N-(p-ethoxyphenyl) alanine | 2 | N-(p-ethoxyphenyl) N-(p-nitrobenzoyl) alanineg | 90-1 |
| 47 | N-(p-ethoxyphenyl) phenyl alanine | 2 | N-(p-ethoxyphenyl) N-(p-aminobenzoyl) alanine | 177-8 |
| 48 | N-(p-methoxyphenyl)phenyl glycine | 1 | N-(p-methoxyphenyl)N-(p-chlorobenzoyl) phenyl glycine | |
| 49 | N-(p-ethoxyphenyl) phenyl glycine ethylester | 1 | N-(p-ethoxyphenyl) N-(p-chlorobenzoyl) phenyl glycine ethylester | |
| 50 | N-(p-methoxyphenyl) o-tolylglycine | 1 | N-(p-methoxyphenyl) N-(p-chlorobenzoyl) o-tolyl glycine | |
| 51 | N-(p-ethoxyphenyl) o-tolyl glycine ethylester | 1 | N-(p-ethoxyphenyl) N-(p-chlorobenzoyl) o-tolyl glycine ethylester | |
| 52 | N-(p-ethoxyphenyl) 3-phenyl alanine ethylester | 1 | N-(p-ethoxyphenyl) N-(p-chlorobenzoyl) 3-phenyl alanine ethylester | |
| 53 | N-(p-methoxyphenyl) cyclopentyl glycine | 1 | N-(p-methoxyphenyl) N-(p-chlorobenzoyl) cyclopentyl glycine | |
| 54 | N-(p-ethoxyphenyl) cyclopentyl glycine ethylester | 1 | N-(p-ethoxyphenyl) N-(p-chlorobenzoyl) cyclopentyl glycine ethylester | |
| 55 | N-(p-methoxyphenyl)-3-(4'-morpholinyl) alanine | 1 | N-(p-methoxyphenyl) N-(p-chlorobenzoyl) 3-(4'-morpholinyl) alanine | |
| 56 | N-(p-methoxyphenyl)-3-(2'-thienyl) alanine | 1 | N-(p-methoxyphenyl) N-(p-chlorobenzoyl) 3-(2'-thienyl) alanine | |
| 57 | N-(p-methoxyphenyl)-3-(4'-methyl 2'-thienyl) alanine | 1 | N-(p-methoxyphenyl) N-(p-chlorobenzoyl) 3-(4'-methyl 2'-thienyl) alanine | |
| 58 | N-(p-methoxyphenyl) glycine phenyl ester | 1 | N-(p-methoxyphenyl) N-(p-chlorobenzoyl) glycine phenyl ester | |
| 59 | N-(p-methoxyphenyl) glycine benzyl ester | 1 | N-(p-methoxyphenyl) N-(p-chlorobenzoyl) glycine benzyl ester | |
| 60 | N-(p-methoxyphenyl) amino acetonitrile | 8 | N-(p-methoxyphenyl) M-(p-chlorobenzoyl) glycine amide | 161-2 |
| 61 | N-(p-methoxyphenyl) glycine ethylester | 1 | N-(p-methoxyphenyl) N-(p-chlorobenzoyl) glycine diethylamide | |
| 62 | N-(p-methoxyphenyl glycine methylester | 1 | N-(p-methoxyphenyl) N-(p-chlorobenzoyl) glycine morpholide | |
| 63 | N-(p-methoxyphenyl) glycine | 1 | N-(p-methoxyphenyl) N-(p-chlorobenzoyl) sodium glycinate | 267-8 |
| 64 | do | 1 | N-(p-methoxyphenyl) N-(p-sulfamidobenzoyl) glycine | |
| 65 | N-(p-methoxyphenyl) alanine ethylester | 1 | N-(p-methoxyphenyl) N-(p-sulfamidobenzoyl) alanine ethylester | |
| 66 | N-(p-methoxyphenyl) amino ethyl malonate | 5 | N-(p-methoxyphenyl (N-(p-chlorobenzoyl) amino ethyl malonate | |
| 67 | | 5 | N-(p-methoxyphenyl) N-(p-chlorobenzoyl) amino sodium ethyl malonate | 235-40 |

¹ E₁ mm. Hg=205-8°.

PHARMACOLOGICAL PROPERTIES

Generally speaking the present compounds have a low toxicity the LD₅₀ being generally greater than 1 g./kg. orally and 0.4 g./kg. subcutaneously in the mouse.

Daily administration of 0.2 g./kg. orally does not cause any toxic effects in the rat even after 60 days of continuous treatment. Examination of the viscera does not indicate any anomaly of the various organs studied.

The present compounds diminish or cause the disappearance at varied dosages, of convulsions occasioned in the rat by injection of phenyl-2-benzoquinone-1,4, according to the procedure prescribed by Siegmund, Cadmus and Lu, Proc. Soc. Exp. Biol. Med. 1957, 95, 729, as modified by Carroll and Limm-Feder. Proc. 1958, 17, 357.

In the test of Woolfe and McDonald, J. Pharm. Exp. Therap., 1944, 80, 300, carried out according to the technique of Fingl, Olsen, Harding, Cockett and Goodman—J. Pharm. Exp. Therap., 1952, 105, 37, these compounds administered subcutaneously diminish the reaction time of a mouse to the application of a source of heat under its paws.

The anti-inflammatory activity of these compounds is determined by inhibition of the oedema to formaline and dextran according to the method of Domenjoz and Wilhemi—Arzneim. Forsch., 1951, 1, 151, is considerable and exceeds in many cases the effects of phenyl-butazone.

A representative compound of this series which is selected by way of example is N-(p-methoxy-phenyl)-N-(p-chlorobenzoyl)-glycine.

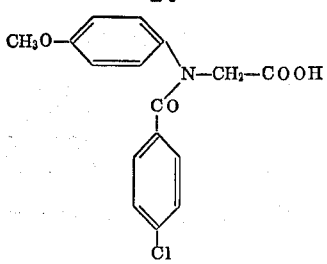

PHYSICAL CHARACTERISTICS

The above named compound is slightly coloured and melts at 192° C. (uncorrected) and is soluble in various organic solvents, alcohol, ether, ethyl acetate.

This compound has a maximum U.V. absorption at $\lambda_{max}=227.5$ m$\mu$, in alcoholic solution with $$E^{1\%}_{1\,cm}=580$$

which facilitates its identification and its dosage in unit dosage forms.

In the case of α-amino acid derivatives having more than two carbon atoms there occurs optical isomerism and the product obtained by the total synthesis is racemic. The different activities observed with these compounds can be due partly to this fact. Isolation of one of the optical forms (d- or l-) leads to an increase of this activity.

PHARMACOLOGICAL ACTIVITY OF PREFERRED COMPOUND TOXICITY (1) Acute toxicity.—(a) Orally in the rat the administration of a single dose of 1 g. per kg. does not cause death. Administration must be repeated for 2 or 3 days to cause the death of certain animals.

(b) Subcutaneously a single dose of 540 mg./kg. causes the death of 50% of the animals within 24 hours after injection.

(2) Sub-acute toxicity.—The daily chronic administration of the compound for a month was effected on male Wistar rats. With an oral dosage of 400 mg./kg./day no mortality was noted in animals.

With a subcutaneous injection at a dosage of 200 mg./kg./day and 300 mg./kg./day the compound caused the death of no animals after a daily treatment carried out for three weeks.

Upon autopsy no macroscopic alteration of the different organs was detectable. Mice treated each day with 200 mg./kg. orally did not show any signs of intoxication for 60 days.

ANTI-INFLAMMATORY ACTIVITY

This activity was tested by using the inhibition of oedema to formaline and by comparing with known anti-inflammatory compounds. Results were obtained on a series of 10 rats:

| Treatment | Type of administration | Increase in volume of the paw as a percent of initial volume |
|---|---|---|
| None | | 34.4 |
| Compound of the invention, 173 mg./kg | Single administration, orally | 12.3 |
| Compound of the invention, 131 mg./kg | Single oral administration | 19 |
| Monophenyl butazone, 138 mg./kg | Single administration, orally | 22.8 |
| Cortisone, 10 mg./kg | Three days intramuscularly | 14.8 |

ADMINISTRATION

The claimed compounds have been administered orally as capsules coated tablets or pills obtained by mixing the active ingredient with the usual excipients. Generally the concentration of the active principle is of 100–200 mg. per unit dosage form.

In certain cases of pre-existing gastric intolerance the compound suitably may be used in its sodium salt-form.

Where it is desired to use the active compounds as suppositories, a liposoluble derivative such as a butyl ester may be used.

The present compounds also can be injected in the form of, for example, a 10% solution of their sodium salts.

They may also be administered as a syrup (10%) or as a suspension.

DOSAGE

The effective dosage of the compounds of the invention depends upon the severity, the stage, and the individual characteristics of each case and will be determined by the attending physician. In the following examples of clinical cases various dosages are indicated by way of example.

Clinical observations of antalgic and anti-inflammatory properties

Antalgic properties

Number of cases studied _____ 20
Results:
  Very good _____ 10
  Good _____ 4
  Inconclusive _____ 6

It should be noted that many of these patients had not been sedated by treatment with salicylates.

Anti-inflammatory effects

Number of cases _____ 15
Disappearance of oedema _____ 8
Improvement in mobility _____ 10
Inconclusive results _____ 5

The compound does not give arise to side effects. Where gastric problems arise they are eliminated by replacing the free acid by its sodium salt.

CONCLUSIONS

Favourable results have been obtained by using a posology of 600 mg. per day of active compound using six 100 mg. capsules taken two at a time three times a day.

Preferably the capsules are taken with alkaline water.

The antalgic effects appear very rapidly after taking the medicaments and maintain themselves for an important lapse of time.

Inflammatory oedema disappears after a few days of treatment.

The foregoing pharmacological results were confirmed clinically, representative clinical histories being as follows:

A 15 year old female had cephalic disturbances, urine incontinency, personality troubles evolving from the age of 7 with relapse at the age of 13 and for pains in the joints with chronic rheumatism attacks.

Upon examination were noted:
(a) Choretic syndromes:
  with predominant lack of motor coordination in the upper members.
  sphincterial and balance troubles and personality troubles.
(b) Arthritic syndrome:
  spontaneous pain occasioned by the joints, especially the shoulders, of the type periarthritis and scapulohumeral with irradiation in the nape of the neck and in the hands especially at night.
inflammatory oedema.
stiffening without lessening of active and passive mobility.

(c) Biological examination:
Antistreptolysine—680 u.
VS: 1 hr., 20 mins.—24 hours, 46 mins.

This patient was treated with three capsules of 300 mg./24 h. five days a week for two months together with viamin B. The pain was rapidly sedated in particular with respect to the arthritic syndrome and the joints became less stiff and the inflammatory oedema disappeared. The choreo-athetosic condition improved. After two months of treatment the chronic rheumatismal condition and the neuro-muscular condition improved spectacularly.

A 50 yea old male complained of painful attacks of the sciatalgic type. Upon examination were noted signs of spondylarthritis of the ankylosis type which had gone on according to the patient for 25 years. Also noted was a total rigidity of the spine and ankylosis of the costovertebral joints and sacro-iliac-cyphosis together with periostosis of the iliac crests with diffuse osteoporosis. Also noted were pains in the left hip area with projection to the back side of the thigh. Similarly were noted lumbar pain projecting to the left thigh and aggavated by coughing and manual pressure. The reflexes and physical sensitivity were normal. The biological indicia noted were a normal hemogram of 17 ceto being 11.4 mg./24 hours. This patient was given 3 capsules of 300 mg./24 hours for six months. There was noted a progressive improvement of the painful symptoms, in particular in the lower limbs. No noteworthy modifications were noted in the spondylarthritic sydrome. However the sciatalgic syndromes were so improved that the patient was able to resume work.

A female of 65 complained of headaches, asthenia and pain in the joints. Upon examination there was noted a considerable plethora of polyarthritic rheumatism which had worsened over the years to a type of gout. The patient also complained of pain in the joints which were not managed by any steroides or sedatives. These pains were principally in the shoulder, the nape of the neck and the hips. Functional troubles including stiffness and great difficulty in moving the head as well as the upper and lower limbs as well as acrodysesthesia of the fingers.

X-rays showed a generalized arthrosis in particular in the shoulder, the hips and in the cervical column. Biological examination showed a normal hemogram and uric acid at 0.03 g./l. This patient was administered 600 mg./24 hours for three weeks and then 300 mg. for six weeks. At the end of this treatment the patient was able to freely move her head without any trapezian pain. Considerable improvement was noted in the active and passive movements of the upper and lower limbs in particular with respect to bending and rotation and since the acroparesthesia of the fingers had disappeared the patient was able to once again work around her home.

What is claimed is:
1. Composition having the formula:

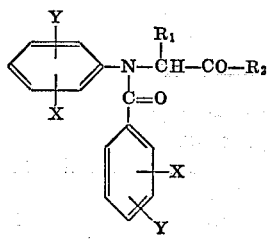

where
$R_1$ is H, methyl, ethyl, phenyl, benzyl, o-tolyl, cyclopentyl, carboxy, sodium carboxy and carboethoxy;
$R_2$ is OH, alkoxy of up to 6 carbon atoms, phenoxy, benzyloxy, an alkali metal or alkaline earth metal salt of the corresponding acid;
X and Y are H, OH, alkoxy of up to 2 carbon atoms, alkyl of up to 2 carbon atoms, chloro, amino, or nitro, each X and Y being the same or different, as well as the —l and —d isomeric forms and racemic mixtures thereof.

2. A composition according to claim 1 having the formula:

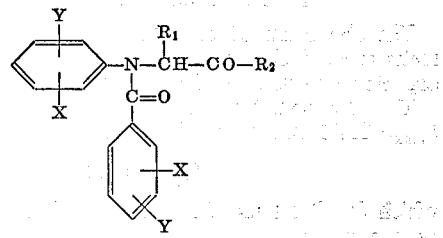

wherein
$R_1$ is H, methyl, ethyl, phenyl, benzyl, o-tolyl, cyclopentyl,
$R_2$ is OH, or an alkali metal or an alkaline earth metal salts of the corresponding acid,
X and Y are H, OH, alkoxy of up to 2 carbon atoms, alkyl of up to 2 carbon atoms, chloro, amino or nitro each X and Y being the same or different, as well as the —l and —d isomeric forms and racemic mixtures thereof.

3. Composition of claim 1 having the formula

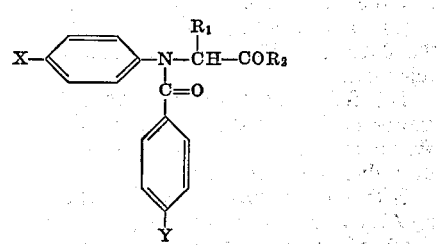

wherein
$R_1$ is H or $CH_3$,
$R_2$ is OH or alkoxy of up to 6 carbon atoms, and
X and Y are the same or different and may be OH, methoxy, ethoxy, chloro, amino or nitro.

4. Composition according to claim 1 which is N-(p-ethoxyphenyl)-N-(p-chlorobenzoyl)-glycine ethyl ester.

5. Composition according to claim 1, which is N-(p-methoxyphenyl)-N-(p-chlorobenzoyl)-glycine.

6. Composition according to claim 1, which is N-(p-ethoxyphenyl)-N-(p-chlorobenzoyl)-glycine.

7. Composition according to claim 1, which is N-(p-methoxyphenyl)-N-(p-chlorobenzoyl)-alanine.

8. Composition according to claim 1, which is N-(p-methoxyphenyl)-N-(p-chlorobenzoyl)-glycine ethylester.

9. Composition according to claim 1, which is N-(p-methoxyphenyl)-N-(p-chlorobenzoyl)-alanine ethyl ester.

10. Composition according to claim 1, which is N-(p-ethoxyphenyl)-N-(p-chlorobenzoyl)-alanine ethylester.

11. Composition according to claim 1, which is N-(p-methoxyphenyl)-N-(p-nitrobenzoyl)-glycine.

12. Composition according to claim 1, which is N-(p-methoxyphenyl)-N-(p-aminobenzoyl)-glycine.

13. Composition according to claim 1, which is N-(p-ethoxyphenyl)-N-(p-nitrobenzoyl)-alanine.

14. Composition according to claim 1, which is N-(p-ethoxyphenyl)-N-(p-aminobenzoyl-glycine.

15. Composition according to claim 1, which is N-(p-hydroxyphenyl)-N-(p-chlorobenzoyl)-glycine ethyl ester.

16. Composition according to claim 1, which is N-(p-hydroxyphenyl)-N-(p-chlorobenzoyl)-alanine ethyl ester.

17. Composition according to claim 1, which is N-(p-ethoxyphenyl)-N-(p-chlorobenzoyl)-glycine butyl ester.

References Cited

UNITED STATES PATENTS 3,484,481  12/1969  Obendorf et al. _____ 260—519

LORRAINE H. WEINBERGER, Primary Examiner

L. A. THAXTON, Assistant Examiner

U.S. Cl. X.R.

260—247.2 R, 247.2 A, 332.2 A, 470, 471 R, 518 A, 518 R, 519, 558 D, 558 A, 559 A; 424—248, 275, 309, 319, 324